United States Patent [19]
Omvik

[11] Patent Number: 5,838,836
[45] Date of Patent: Nov. 17, 1998

[54] METHOD AND APPARATUS FOR ROUGH CROPPING IMAGES

[75] Inventor: John F. Omvik, North Andover, Mass.

[73] Assignee: Agfa Division-Bayer Corporation, Wilmington, Mass.

[21] Appl. No.: 553,938

[22] Filed: Nov. 6, 1995

[51] Int. Cl.$^6$ .................................................. G06K 9/36
[52] U.S. Cl. ..................... 382/276; 358/514; 358/515; 355/53; 355/71; 355/75; 355/77
[58] Field of Search .................................. 382/276, 317; 355/53, 71, 75, 77, 125; 348/96; 358/514, 515, 403, 450; 229/69

[56]  References Cited

U.S. PATENT DOCUMENTS

| | | | |
|---|---|---|---|
| 4,132,480 | 1/1979 | Reed | 355/75 |
| 4,455,082 | 6/1984 | Lepist | 355/75 |
| 4,970,547 | 11/1990 | Desai | 355/61 |
| 5,122,871 | 6/1992 | Israeli et al. | 358/515 |
| 5,438,430 | 8/1995 | Mackinlay et al. | 358/450 |
| 5,534,971 | 7/1996 | Gaetano | 355/126 |
| 5,611,482 | 3/1997 | Gaetano | 229/69 |

*Primary Examiner*—Leo H. Boudreau
*Assistant Examiner*—Daniel G. Mariam
*Attorney, Agent, or Firm*—John A. Merecki

[57]  ABSTRACT

A method and apparatus for performing a rough crop of a mounted image off-line prior to scanning. The apparatus comprises a kit having cards with apertures of various defined sizes and slide holders corresponding to standard original (film) sizes to be used. Each aperture card is labeled for identification, and each slide holder is marked with labeled lines at discrete intervals parallel to the card edges, following a Cartesian orientation. An original to be scanned is mounted in a slide holder corresponding to its size, and an aperture card selected for the desired cropping aperture, from the set included in the kit, and placed on top of the slide holder card with the outside edges of both cards aligned. An offset of the crop aperture from the center of the image is accomplished by shifting the crop card until one or more of the parallel lines on the slide holder come into view. When the desired rough crop aperture has been achieved, it can be specified quickly by a three-element code comprising the aperture card identifier, and two indices identifying which the offsets as given by the exposed parallel lines.

12 Claims, 6 Drawing Sheets

METHOD AND APPARATUS FOR ROUGH CROPPING IMAGES

BACKGROUND

The field of the invention is the use of digital scanning systems in the electronic pre-press and photographic industries. The invention relates specifically to the initial preparation of original images for scanning, and for specification of rough cropping information for automatic use by a scanning system.

As the electronic pre-press industry has evolved, image quality expectations have increased greatly, thereby involving the use of ever more expensive scanning and processing equipment Efficient work flow and productivity (both for expensive equipment and skilled labor) demands an increasing level of automation. In typical state of the art systems, images to be scanned are prepared "off-line" at a mounting station, and information identifying the image together with its processing requirements passed in machine-readable or easily coded form to the scanning system for automatic setup and control. The productivity goal can be further seen as that of keeping the scanner functioning at the highest duty cycle performing productive work, requiring a minimum of repeated scans, manual setup or corrective procedures. As an example, transparent images are typically mounted in standard holders providing self-identification in machine-readable format, such that information used for automatic non-intervention scanning can occur continuously under control of such information.

The process of electronic scanning of images produces a rectangular array of picture elements, referred to as "pixels", which are then processed using software in a graphic arts workstation, typically for output to printed media using offset or other printing methods. Image processing in the workstation includes color correction, rotation, scaling, and selection of the specific area of the image to be printed (cropping).

In order to avoid scanning and storing an excessive amount of image area which is not to be used in final output, a rough crop is performed prior to the final (high-resolution) scanning of an image. Methods in the prior art used for this purpose include both software (on-line) and hardware (off-line) procedures, to be reviewed as follows.

Rough cropping in software is usually done by performing a "preview" scan of an image at a resolution low enough to permit a quick scan of the entire image, and high enough to permit a workstation user to identify the area to be cropped. This procedure requires the extra steps of scanning and workstation manipulation before the actual high-resolution scan is performed, thereby adversely impacting the productivity of both scanner and workstation.

Traditional off-line cropping is usually done by physically masking the image, cutting and deleting a portion of an original, mounting the original in a special relationship to a pre-determined cropping window, or using a reference grid for a loose original to specify a relationship to be set up manually later when the material is placed in the scanner. Examples of the latter type of traditional systems can be found in U.S. Pat. No. 4,132,480 and U.S. Pat. No. 4,970,547, respectively.

Another off-line approach is the use of a digitizing system to locate the coordinates of a rough-cropping window, to be input separately and/or used for scanner control. These systems have the disadvantage of being time-consuming as well as requiring expensive mounting-station equipment.

From the above discussion, it can be seen that the process of determining a rough crop for an image and its specification to the scanner control system has become a significant obstacle to the scanner system productivity goal stated above. The on-line methods tie up both scanner and operator in extra processing steps, while the off-line methods, as described in the prior art, involve extensive procedures or expensive mounting-station equipment, and do not lend themselves easily to automatic scan processing.

It is important to note also that the prior art methods are generally directed towards final (i.e., "precision") cropping of an original image. Final cropping is a necessity, for example, in photocopying or enlarging of an image. For the present application, final cropping is a routine part of post-scanning image processing, and is normally carried out to a higher precision than possible with the methods described above (with the possible exception of off-line-digitization). Since the purpose of rough cropping is not to define a precision crop but to save scanning time and storage space, it can be accomplished with fairly large tolerance provided that the rough crop region ultimately includes the final crop region. Such a tolerance can be achieved visually without the necessity of magnification, even with images on 35 mm film.

It is therefore a general object of the invention to provide a method for preparing original images for automatic non-intervention scanning by a high-resolution, high-productivity scanning system.

It is a specific object of the invention to provide an efficient and cost-effective method for determining a rough crop of a mounted image prior to scanning, and for specifying the rough crop so determined to the scanning system.

It is another specific object of the invention to maximize the utilization of a production scanner and workstation system through elimination of the necessity of extra scans and on-line processing steps carried out solely for the purpose of determining and specifying a rough crop of an image to be scanned.

It is a feature of the invention that a rough crop of a mounted image can be determined and specified at an off-line mounting station without the use of extensive procedures.

It is another feature of the invention that a rough crop can be determined and specified at an off-line mounting station without the involvement of digitizing or other expensive equipment.

It is still another feature of the invention that mounting operations including determining and specifying the rough crop of images to be scanned can be carried out at one or more mounting stations in parallel with actual scanning of images previously prepared.

SUMMARY OF THE INVENTION

The invention is a method and apparatus for performing a rough crop of a mounted image off-line prior to scanning. The apparatus comprises a kit having cards with apertures of various defined sizes and slide holders corresponding to standard original (film) sizes to be used. Each aperture card is labeled for identification, e.g., with a letter, and each slide holder is marked with labeled lines at discrete intervals parallel to the card edges, following a Cartesian orientation.

The method for performing the rough crop using the above apparatus is as follows. An original to be scanned is fixedly mounted in a slide holder corresponding to its size, and an aperture card selected, for the desired cropping aperture, from the set included in the kit. If the aperture card is placed on top of the slide holder card and the outside edges of both cards are aligned, the cropped area is located in the center of the image. An offset of the crop aperture from the center of the image is accomplished by shifting the crop card until one or more of the parallel lines on the slide holder come into view. When the desired rough crop aperture has been achieved, it can be specified quickly by a three-element code comprising the aperture card identifier, and two indices identifying the offsets as given by the exposed parallel lines. For example, if the desired rough crop is obtained using an aperture card labeled "B" placed on a slide and offset two lines to the left and one up, a possible form for this three element code is "B-21".

The above information can be obtained quickly by visual inspection of a mounted original without the necessity of permanently marking the holder or attaching anything to it. A light table can be used if desired, but is not necessary for the rough crop specification.

Numerous methods exist in accordance with the method of the invention for conveying the rough-crop code to a processing system, including direct keyboard entry from a remote control workstation, setting panel control buttons on a scanner, and use of a machine-readable coding system such as bar-codes optionally combined with slide identification information and other processing control information.

The invention differs from methods used in the prior art in that no image scanning is required (preview or final) prior to rough-crop specification, and no expensive digitizing or off-line setup station is required for definition of the cropping information prior to the scan.

BRIEF DESCRIPTION OF THE DRAWINGS

The objects and features of the invention will best be understood from a detailed description of the invention and a preferred embodiment thereof selected for the purposes of illustration and shown in the accompanying drawings in which.

DETAILED DESCRIPTION OF THE INVENTION

Figure 1:
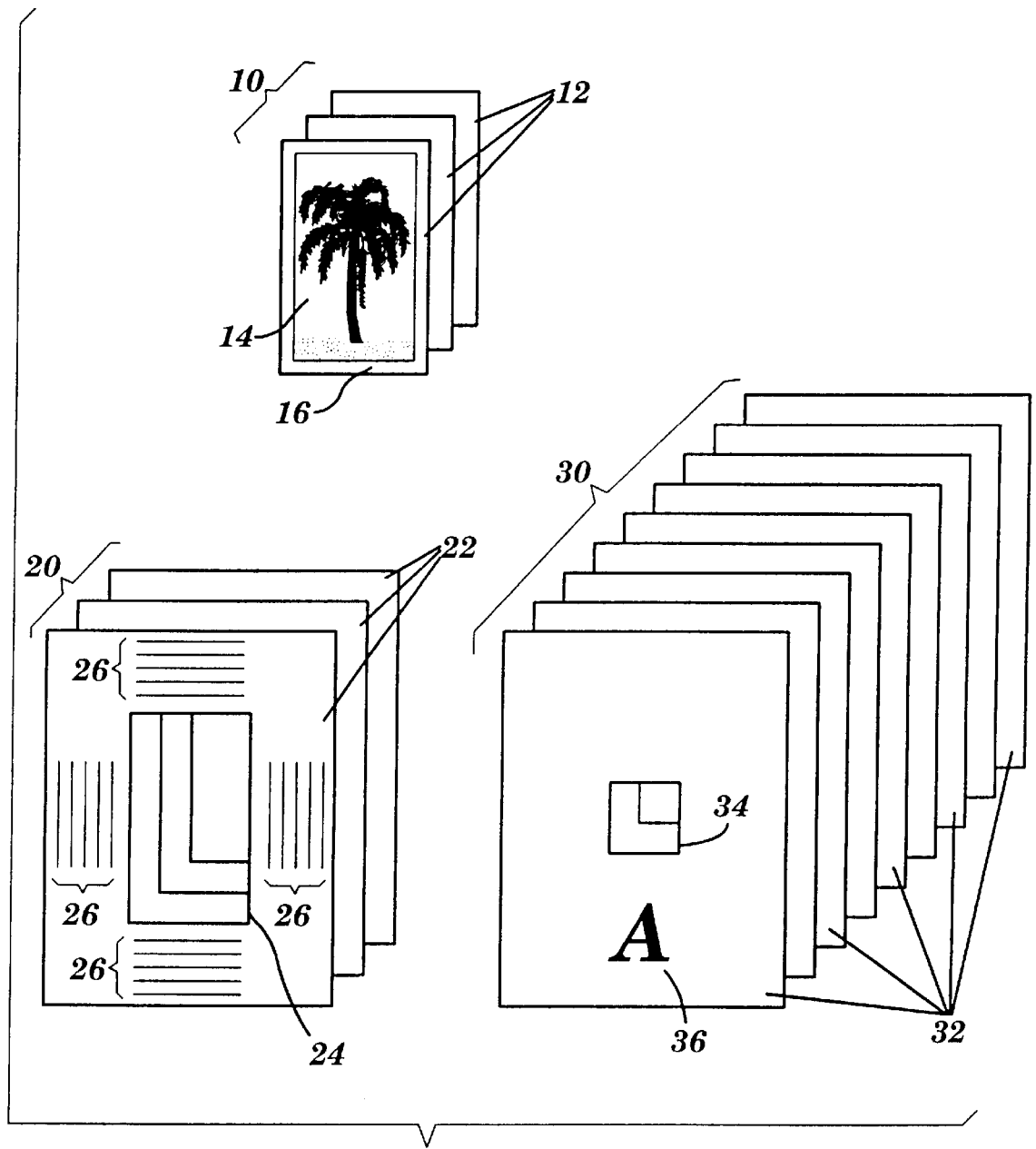
FIG. 1 shows the apparatus to be used for mounting and rough cropping original images to be scanned according to the method of the invention.

Turning now to the drawings, the various embodiments of the invention will be described in detail. FIG. 1 shows, as a preferred embodiment of the invention, the apparatus to be used for mounting and preparation of images for scanning. In the drawing, a set 10 of one or more original images 12 is to be prepared for scanning. As used herein, each original image 12 has a graphic region 14 supported on a substrate 16 such as film or paper. The graphic region 14 is typically a continuous-tone (contone) color photograph, but can additionally include other (color or monochrome) graphic features such as text, line art, tints and degrades. In the discussion, it is assumed that an original image 12 comprises a single transparent image on film, for example a 35-mm color photographic transparency, although reflective images on substrates such as paper, and a plurality of images can also be used. The set 10 can be comprised of images all of the same size, or it can include an assortment of sizes (e.g., of standard film sizes such as 120, 35 and 70 mm, 4"×5", etc.) up to the maximum size supported by the scanning system being used.

The apparatus of the invention is comprised of a set 20 of image holders 22 together with a set 30 of aperture cards 32. The image holders 22 are of a fixed size and shape set by the media handling requirements of the scanner being used, and can be made of any stiff material suitable for reliable transport and registration of film during scanning. Each image holder 22 corresponds to one of the media (film) sizes being used, and has a window 24 within it of dimensions appropriate for the media to which it corresponds, such that an original image 12 of that media size can be removably fixed to and supported by the holder 22 with the full area of the graphic region 14 visible through the window 24. In addition to the window 24, each image holder 22 includes a plurality of visible indicia, shown as four sets 26 of parallel lines printed on the image holder 22 in two mutually perpendicular sets. In the embodiment shown, the sets 26 of lines are disposed essentially parallel to the edges of the image holder 22. It will be clear to one skilled in the art that other indicia layouts following a Cartesian organization can also be used.

The aperture cards 32 comprising the set 30 each contain a rectangular window 34 corresponding to one rough crop area appropriate for the size of the image 14. The cards 32 are labeled, as shown in FIG. 1 by a letter 36.

Figure 2:
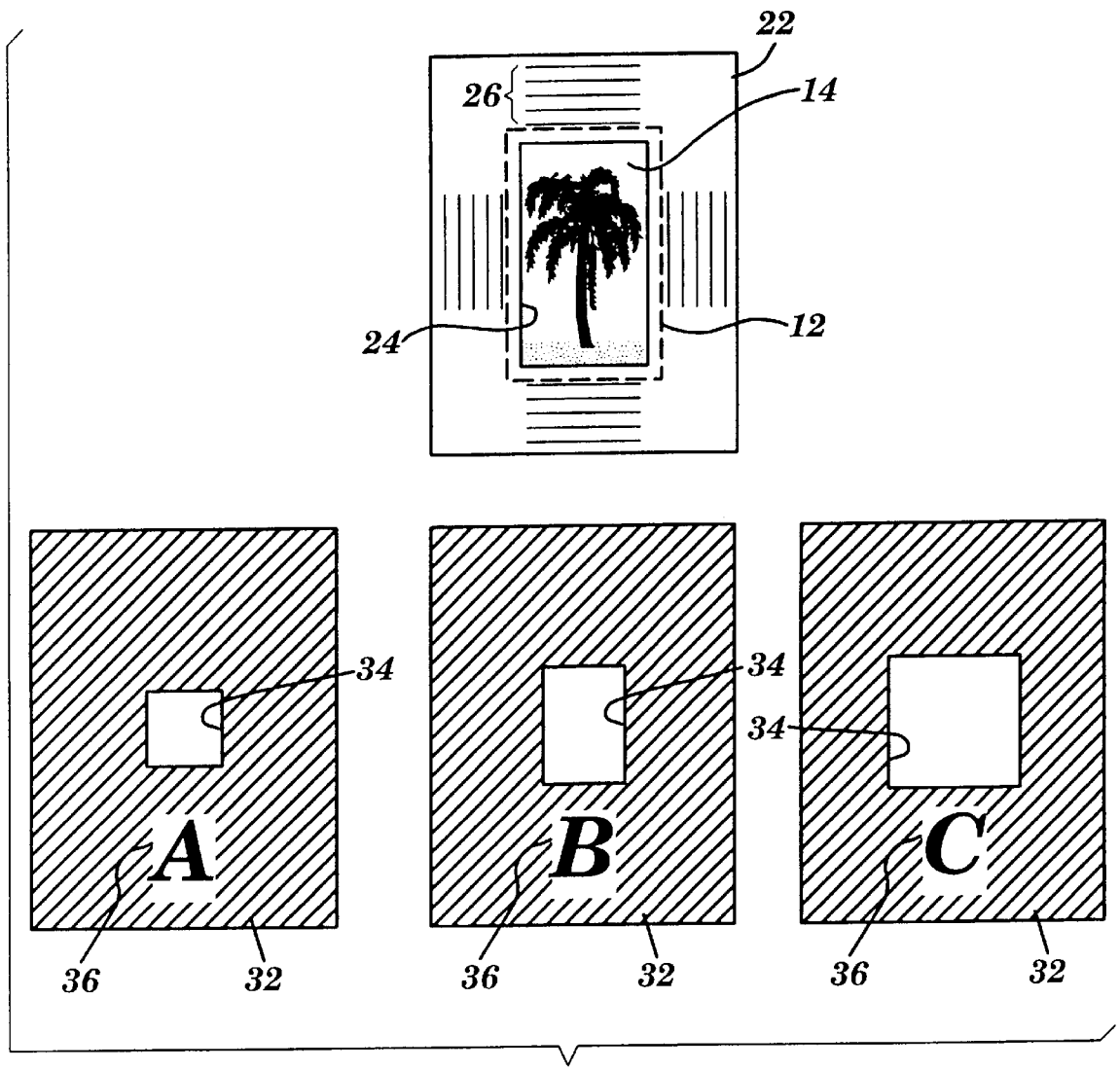
FIG. 2 shows an original transparent image mounted in an image holder, together with three aperture cards of the set shown in FIG. 1.
Figure 3A:
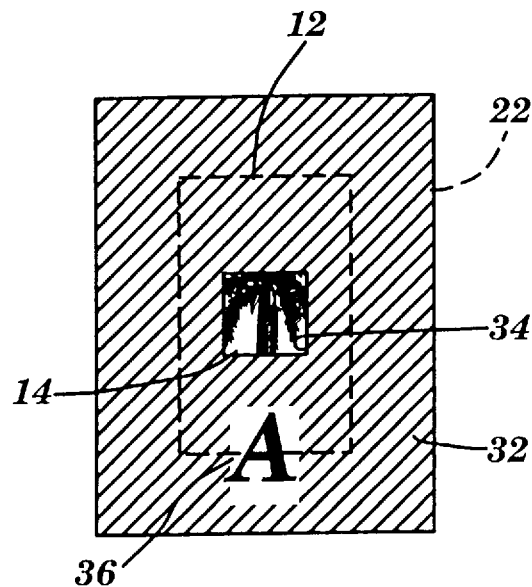
FIG. 3A illustrates the use of a single aperture card from the set of FIG. 2 placed in alignment with the mounted image of FIG. 2.

The method for use of the apparatus of FIG. 1 is illustrated in FIG. 2 and FIG. 3A through FIG. 3C. In FIG. 2, an image 12 of the set 10 of FIG. 1 is first mounted in an image holder 22 such that the entire image area 14 of the image 12 is framed in the window 24. Methods for mounting in the holder 22 are well known in the prior art, and include use of removable tape, mechanical retainer clips, and the like. Three aperture cards 32 corresponding to three different possible rough crop apertures 34 are shown, with identifying labels 36 "A", "B" and "C". In FIG. 3A, the card 32 labeled "A" is placed on top of the image holder 22 containing the mounted original image 12 so that a rectangular region of the image area 14 is framed by the aperture card window 34. This configuration defines a rough crop region for the original image area 14 having a center coincident therewith. None of the parallel indicia are exposed in this case.

Figure 3B:
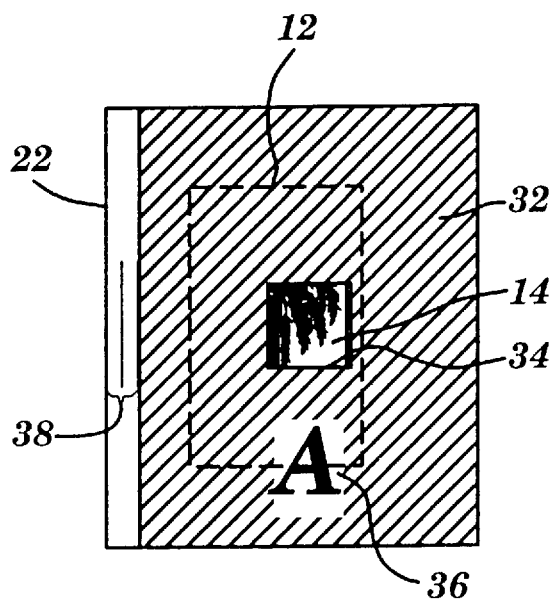
FIG. 3B and FIG. 3C illustrate the effect of repositioning the aperture card of FIG. 3A to define different crop areas.
Figure 3C:
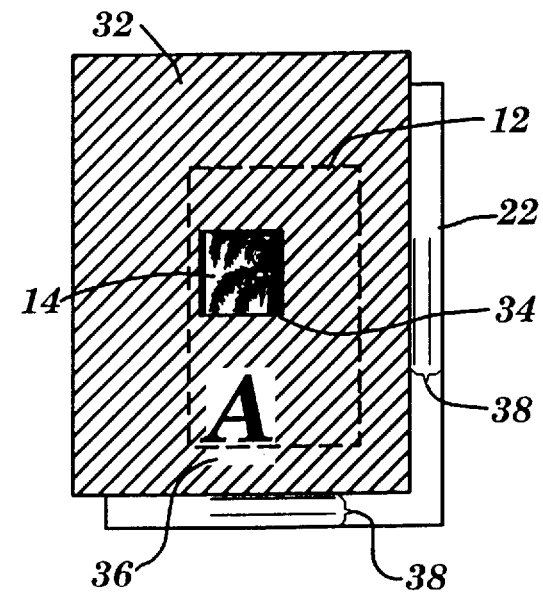

In FIG. 3B, the aperture card 32 of FIG. 3A has been shifted to the right with respect to the image holder 22 while maintaining vertical alignment with it, thereby defining a different rough crop region for the original image area 14. In this case, one or more of the indicia 38 parallel to the left side of the holder 32 are now exposed. In FIG. 3C, the aperture card 32 has again been shifted, this time upwards and to the left with respect to the image holder 22, again defining a different rough crop region for the original image area 14. In this case, two sets of indicia 38 are exposed, parallel to the bottom and right edges of the image holder 22.

Rough Crop Specification

The method for determining and specifying a rough crop region for an image to be scanned is summarized with reference to the drawings of FIG. 1 through FIG. 3B as comprising the following sequence of steps:

1. Selecting an image holder 22 appropriate for the media size of the original image 12 to be scanned, and removably mounting the original image 12 such that the image area 14 is framed in the window 24 of the image holder 22;
2. Selecting an aperture card 32 from the set 30 of available aperture cards;
3. Placing the selected aperture card 32 on top of the image holder 22 containing the mounted original image 12, and moving the aperture card relative to the image holder 22 and the original image 12 fixed within it in such manner as to frame in the aperture 34 the rectangular region of the original image area 14 corresponding to the desired rough crop region thereof;
4. Specifying the rough crop region so determined using three information quantities comprising (1) the label 36 of the selected aperture card 32; (2) a measure of the linear shift of the aperture card in a first coordinate direction (e.g., left or right); and (3) a measure of the linear shift of the aperture card in a second coordinate direction perpendicular to the first (e.g., up or down); and,
5. Using the three quantities so determined for automatic control of the scanning system such as to scan only the desired rough crop region of the original image area 14.

After determining and specifying the rough crop region of an image according to the above process, the selected aperture card 32 and the set 30 of available aperture cards are no longer needed for the scanning and digital processing of this image.

Scanner System Interface

Figure 4:
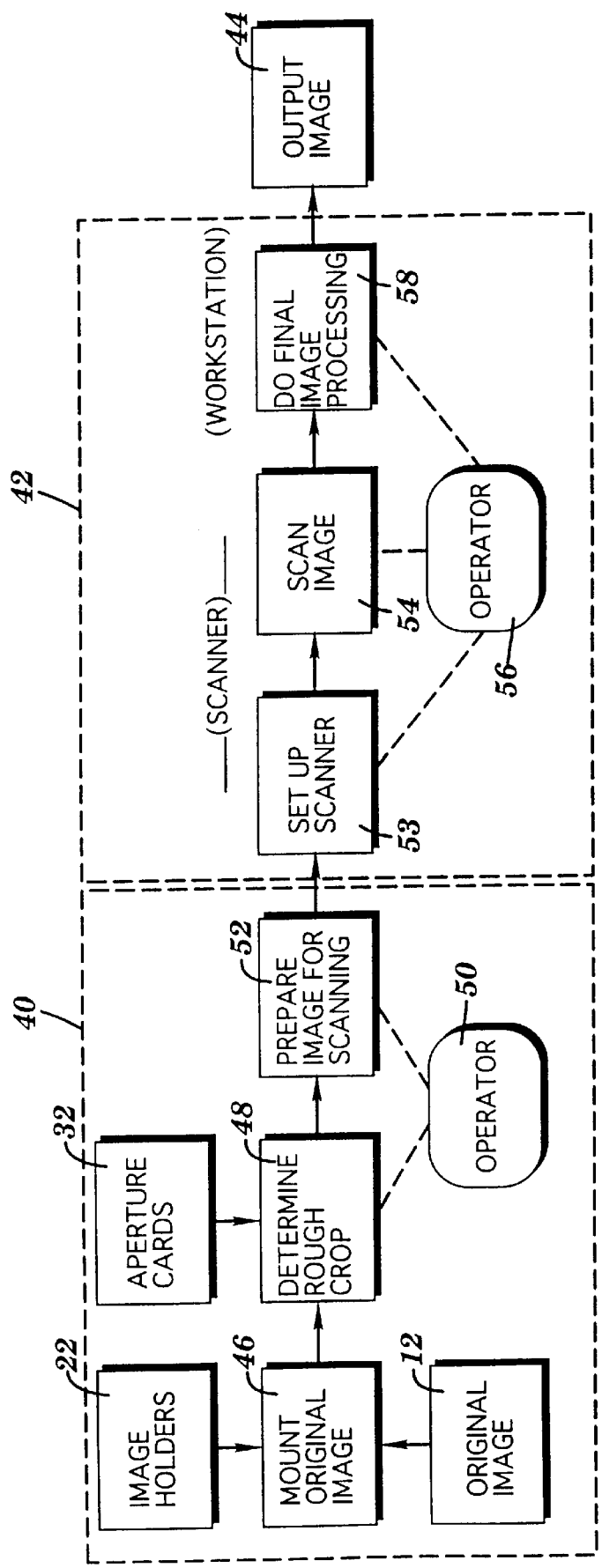
FIG. 4 illustrates a system overview of the processing of original images to be scanned according to the invention.

Numerous methods exist within the scope of the invention for using the rough crop specification as described above in automatic control of the scanner system. These methods involve first a simple coding system employed by an operator at a mounting station once the rough crop region has been identified, and second a procedure for entering this information into the scanning system. These elements are shown in the system diagram of FIG. 4.

In the drawing, the processing steps fall in the "off-line" or pre-processing phase 40 or the "on-line" scanning and final processing phase 42. The final image output 44 can be to an application such as a page layout program, or to an output device such as a printer, imagesetter, or film recorder. In the first step 46, the original image 12 is mounted in an image holder 22 as described previously. The rough crop region is determined 48 according to the method described using an aperture card 32. These operations are carried out by an operator 50 at a location which can be remote from and in parallel with the on-line processing steps 42. The interface with the scanning system 52 is the preparation of mounted original images singly or in a batch for automatic scanning by the scanning system. In this step, each original image is identified using any of the methods well known in the art, such that it can be associated with the resulting scanned image, source and destination information as appropriate, and post-processing requirements. At the same time, the rough crop specification described previously is added to this information, using any of several coding systems to be described further below.

The rough crop specification is used in the scanner set up 53 to determine the start and stop scan limits used in the actual scanning process 54. This information can be transmitted manually, e.g., by writing a three-character code on the mounted image 22 or on a "job-ticket" accompanying it through the various processing stages. In this case the information is entered by an operator 56 during the set up step 53 using the parameters determined for the rough crop specification. The operator 56 carrying out the preparation step 53 can be the same operator 50 performing the off-line preparations.

As an alternative to manual transfer of information, the preparation steps 40 and 52 can be carried out at a remote entry station, in which the identification information, including the rough crop code, can be entered directly into the system, for direct link or networked transmission to the workstation system 58 to be used for receiving, storing, and processing the image data. In this case, a single identification code attached to the image holder 22 can be electronically "read" by the scanning system and used as an access key to retrieve all identification information, including the rough crop parameters, from the workstation system 58.

Alternative Coding Systems

As stated previously, three independent information quantities are used in the specification of the rough crop region determined by the method of the invention. The preferred embodiment shown in the example of FIG. 1 through FIG. 3C assumes a rectangular crop window 34, and employs four sets of lines 26 parallel to the edges of the (rectangular) slide holder 22. An example showing alternative configurations is shown in FIG. 5A.

In the drawing, the original image holder 22 has an opening 24 for mounting an original image 12 as shown previously, and uses a plurality of sets 60 of displacement indicia disposed essentially perpendicular to the bisectors of two or more corners of the image holder 22, thereby again providing means for Cartesian representation of the displacement of an aperture card 32 from central alignment with the image holder 22.

Figure 5A:
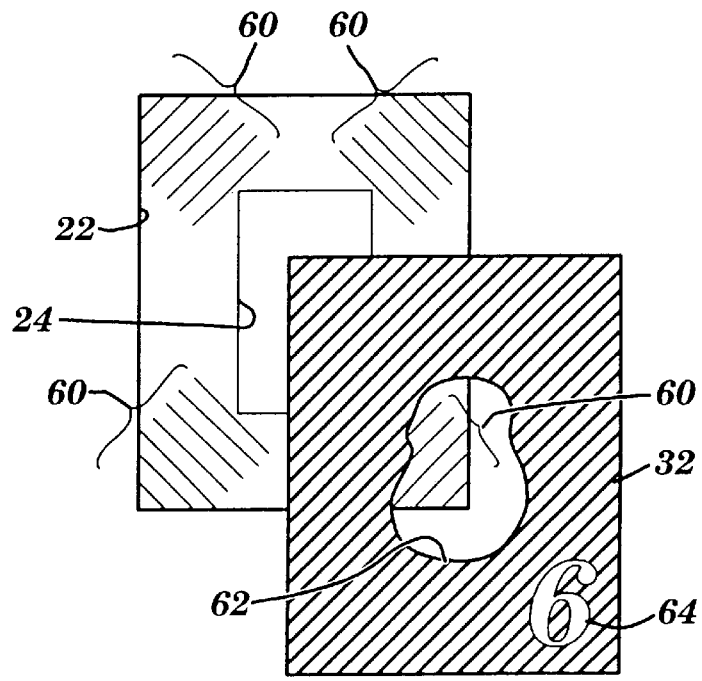
FIG. 5A–FIG. 5C show examples of alternative coding systems for use with the method of the invention; and, FIG. 6 illustrates the conversion of rough crop coding information to scan start and stop limits in a scanning system.

Also shown in FIG. 5A is an aperture card 32 having an opening 62 which is of an arbitrary shape rather than the rectangular opening 34 as shown previously in FIG. 1 through FIG. 3C, and has an identifying label 64 comprising a numeral rather than a letter 64 as shown in the same examples.

Figure 5B:
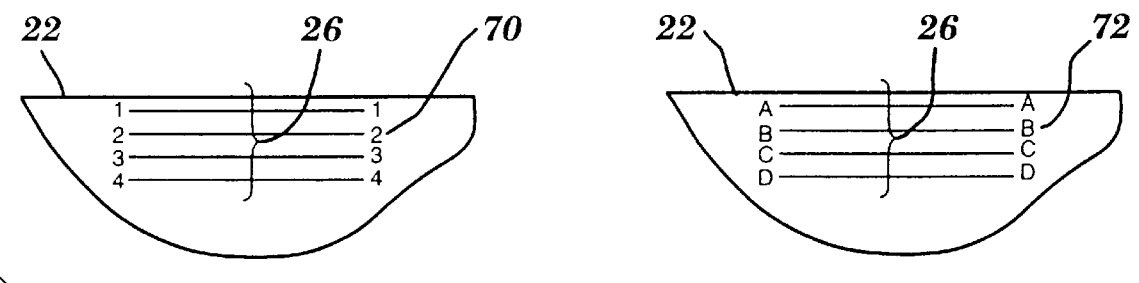

Numerous options exist for labeling the aperture cards and the indicia used for determining the rough crop specification. Several examples of indicia are illustrated in FIG. 5B, wherein a portion of the top of an image holder 22 is shown together with a set of parallel line indicia 26 as described in the examples of FIG. 1 through FIG. 3C. In the first case, the offset from the edge of the card 22 is encoded numerically with the set 70 of numbers. Such numbers can be interpreted for coding purposes as positive on one side of the card and negative on the other, or can count up (0,1,2, 3, . . . ) on one side of the card and down on the other (0,9, 8, . . . ). As an alternative to numeric coding, a system of letters 72 can be shown as in the second example Again, such encoding can make use of "+" and "−" or other characters for distinguishing offsets from one side or the other, or can use a variation of the above up/down counting arrangement, with 0,A,B,C, . . . being used for offsets from one side and 0,Z,Y,X,W, . . . for offsets from the other. It will be clear to one skilled in the art that many similar encoding schemes exist.

Figure 5C:
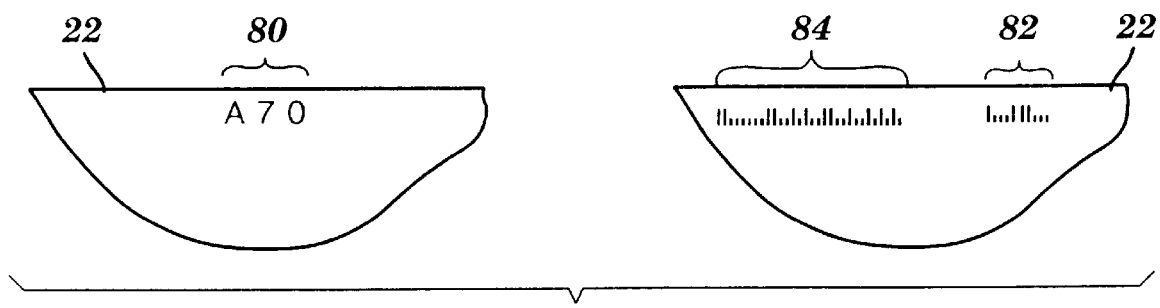

FIG. 5C illustrates two examples means for encoding the rough crop information for transfer to the scanning system. In the first example, a three character code 80 is printed on the image holder 22 for use by an operator 56 (see FIG. 4) in setting control parameters for scanning. In this case, any form of human-readable marking can be used (e.g., with pencil on an erasable area of the image holder 80, or with a label printer at a mounting station). In the second example, a bar-code system is illustrated, wherein a bar-coded label is printed at a mounting station for use on an image holder 22, with the label giving a machine-readable version of the rough crop code 82 along with other identification and job processing information 84.

Figure 6:
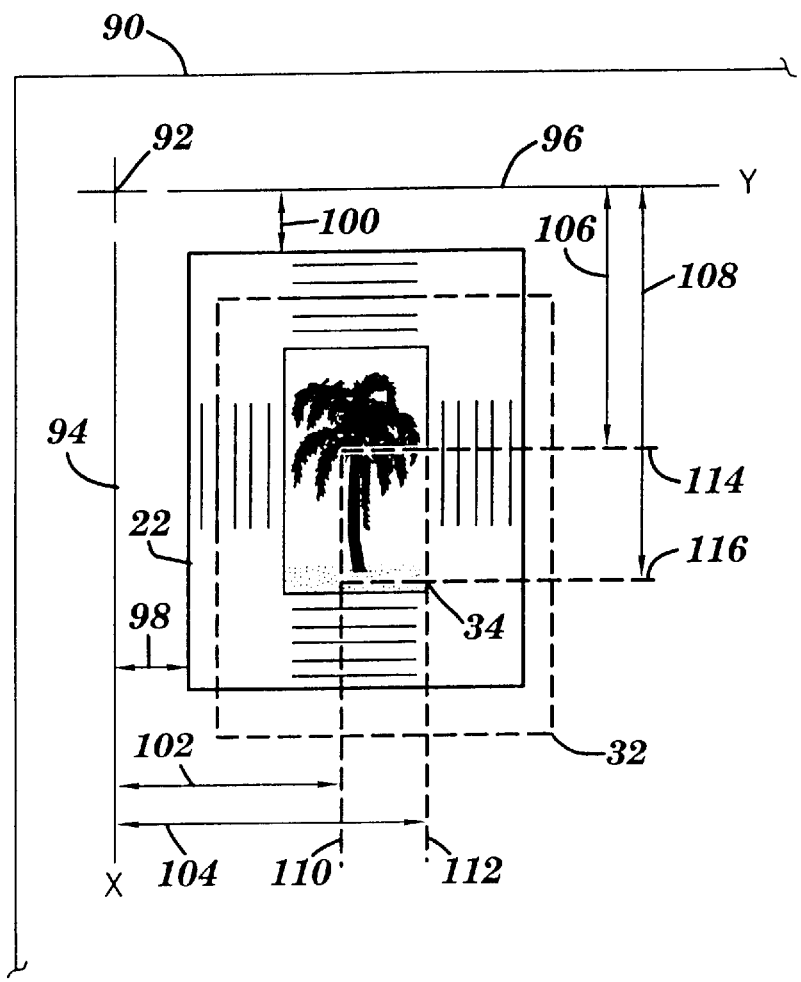

FIG. 6 illustrates the translation of the rough crop code input to a scanning system in the set up step 53 to actual start and stop scan limits used in control of the scanning process. In the drawing, an image holder 22 is fixed in position in scanner 90 having a system reference point 92 defining two orthogonal axes shown as an x-axis 94 and a y-axis 96. The image holder 22 is accurately registered with respect to the reference point 92, with known distances 98 and 100 from the two axes 94 and 96. The internal coordinate system of the scanner positioning means can use any linear measurement unit, e.g., millimeters, microns, points, or pixels at a given resolution.

The three parameters comprising the rough crop code for the image holder 22 to be scanned are used by an internal conversion means (not shown) to convert the offset of an aperture card 32, given in arbitrary units as explained previously for FIG. 5A and FIG. 5B into precise offsets of the crop region 34 translated into units of the internal coordinate system, i.e., the offsets 102 and 104 from axis 94, and 106 and 108 from axis 96, thereby defining the start and stop scan limits 110 and 112 in one direction and the start and stop scan limits 114 and 116 in the other. The internal conversion can be accomplished by table lookup or computation means and the scan-control means used with the scan limits so determined are well known in the art.

Having described in detail preferred and alternative embodiments of my invention, it will now be apparent to those skilled in the art that numerous modifications can be made therein without departing from the scope of the invention as defined in the following claims.

What I claim is:

1. A method for determining and specifying a rough crop area for an image to be scanned by a scanning system, said method comprising the following steps:

(A) Selecting an original image to be scanned;

(B) Selecting an image holder, and fixedly mounting said original image in said image holder;

(C) Selecting an aperture card, said aperture card having an opening corresponding to said rough crop area of said image to be scanned;

(D) Identifying said aperture card according to a size and shape of said opening, thereby providing an aperture card identification;

(E) Placing said selected aperture card on top of said image holder and displacing said aperture card relative to said image holder in such manner as to display in said opening a region of said original image corresponding to said rough crop area of said image to be scanned;

(F) Obtaining a measure of said displacement of said aperture card relative to said image holder, said measure of said displacement and said aperture card identification providing a rough crop specification; and, (G) Using said rough crop specification for controlling said scanning system.

2. The method of claim 1 wherein said measure of said displacement comprises two components, the first of said two components being a measure of the displacement in a first direction and the second being a measure of the displacement in a second direction.

3. The method of claim 2 wherein said second direction is substantially orthogonal to said first direction.

4. The method of claim 1 wherein step (G) further includes the steps of:

(G1) Entering said rough crop specification in a data store; and, (G2) Recalling said rough crop specification from said data store for use in controlling said scanning system.

5. The method of claim 1 wherein said measure of said displacement is obtained by visual observation of indicia fixed to said image holder.

6. The method of claim 5 wherein said indicia include two substantially orthogonal sets of lines, and wherein said measure is obtained using the number of said lines in each of said sets which are exposed by displacing said aperture card relative to said image holder.

7. A method for scanning a plurality of original images using a digital scanning system, said method comprising the following steps:

(A) Selecting from said plurality of original images an original image to be scanned, said selected original imaging having an original image identification;

(B) Selecting an image holder, and fixedly mounting said original image in said image holder;

(C) Selecting an aperture card, said aperture card having an opening corresponding to said rough crop area of said image to be scanned;

(D) Identifying said aperture card according to a size and shape of said opening, thereby providing an aperture card identification;

(E) Placing said selected aperture card on top of said image holder and displacing said aperture card relative to said image holder in such manner as to display in said opening a region of said original image corresponding to said rough crop area of said image to be scanned;

(F) Obtaining a measure of said displacement of said aperture card relative to said image holder, said measure of said displacement and said aperture card identification providing a rough crop specification;

(G) Using said original image identification and said rough crop specification for setting up and controlling said scanning system;

(H) Scanning said selected original image; and, (I) Repeating steps (A) through (H) for each of said plurality of original images to be scanned.

8. The method of claim 7 wherein steps (A) through (F) are performed asynchronously with steps (G) and (H) for at least one of said plurality of original images to be scanned.

9. The method of claim 7 wherein steps (A) through (F) are performed at a place separate from that of steps (G) and (H) for at least one of said plurality of original images.

10. The method of claim 7 wherein steps (A) through (F) are performed for one of said plurality of original images while steps (G) and (H) are being carried out for another of said plurality of original images.

11. A kit for rough cropping of original images in for preparation for scanning by a scanning system, said kit comprising the following:

(A) A plurality of aperture cards, each aperture card having an opening corresponding to a rough crop area of an original image to be scanned, said opening being fixed with respect to a center of said aperture card, each aperture card further including means for identifying said aperture card; and, (B) A plurality of image holders, each image holder including means for holding an original image in a fixed disposition during said scanning process, each image holder further including means for determining a displacement of a selected one of said plurality of aperture cards from a center of said image holder to determine said rough crop area.

12. An apparatus for performing a rough cropping of an original image during scanning, wherein said original image is mounted in an image holder, comprising the following:

(A) Means for establishing a set of rough crop parameters defining a rough crop region on said original image to be scanned;

(B) Means for displacing said establishing means relative to a reference location on said image holder to determine displacement criteria;

(C) Means for using said rough crop parameters, said reference location, and said displacement criteria to determine scanning limits; and, (D) Means for controlling said scanning means to scan said original image within said scanning limits thereby rough cropping said image during scanning.

* * * * *